United States Patent [19]

Partington et al.

[11] Patent Number: 5,719,270

[45] Date of Patent: Feb. 17, 1998

[54] AZOPHENYL COMPOUNDS

[76] Inventors: Steven Michael Partington, 48 Woodroyd, Golcar, Huddersfield, W. Yorkshire; David Allan Clarke, 23 Wentworth Court, Brighouse, W. Yorkshire, both of Great Britain

[21] Appl. No.: 783,323

[22] Filed: Jan. 15, 1997

Related U.S. Application Data

[63] Continuation of Ser. No. 617,306, Mar. 18, 1996, abandoned, which is a continuation of Ser. No. 503,423, Jul. 17, 1995, abandoned, which is a continuation of Ser. No. 305,734, Sep. 14, 1994, abandoned, which is a continuation of Ser. No. 104,406, Aug. 10, 1993, abandoned, which is a continuation of Ser. No. 659,342, PCT/GB90/00883 filed Jun. 7, 1990, abandoned.

[30] Foreign Application Priority Data

Jun. 16, 1989 [GB] United Kingdom ............ 8913933

[51] Int. Cl.$^6$ ............ C09B 29/08; C09B 29/12
[52] U.S. Cl. ............ 534/839; 534/788; 534/799; 534/843; 534/845; 534/851; 534/857; 534/859; 534/876
[58] Field of Search ............ 534/839, 843, 534/856, 857, 859, 845, 851

[56] References Cited

U.S. PATENT DOCUMENTS

| | | |
|---|---|---|
| 3,993,619 | 11/1976 | Kruckenberg et al. ............ 534/856 |
| 4,179,436 | 12/1979 | Hugl et al. ............ 534/857 |
| 4,406,661 | 9/1983 | Bühler et al. ............ 534/856 |
| 4,619,893 | 10/1986 | Takagi et al. ............ 534/856 |
| 4,776,886 | 10/1988 | Lorenz et al. ............ 534/856 |

*Primary Examiner*—Fiona T. Powers
*Attorney, Agent, or Firm*—Watson Cole Stevens Davis, P.L.L.C.

[57] ABSTRACT

Azophenyl compounds of the formula:

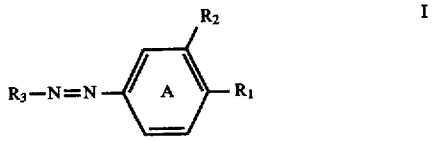

wherein $R_1$ is an o-, p-directing substituent; $R_2$ is a substituted or unsubstituted β-hydroxyalkyl group; $R_3$ is an aromatic carbocyclic or heterocyclic group which is mono- or poly-cyclic and is substituted or unsubstituted; and wherein the benzene ring A may contain one or more further substituents. The compounds are useful as dyestuffs (if they are themselves colored) or as intermediates in the preparation of dyestuffs.

3 Claims, No Drawings

AZOPHENYL COMPOUNDS

CROSS-REFERENCE TO RELATED APPLICATION

This application is a continuation of application Ser. No. 08/617,306, filed Mar. 18, 1996, now abandoned, which was a continuation of Ser. No. 08/503,423, filed Jul. 17, 1995, now abandoned, which was a continuation of application Ser. No. 08/305,734, filed Sep. 14, 1994, now abandoned, which was a continuation of application Ser. No. 08/104,406, filed Aug. 10, 1993, now abandoned, which was a continuation of application Ser. No. 07/659,342, filed. Feb. 15, 1991, now abandoned, which was based on PCT/GB90/00883, filed Jun. 7, 1990.

This invention relates to certain azophenyl compounds which principally are useful inter alia in the preparation of dyestuffs and other materials.

The azophenyl compounds of the present invention have the formula:

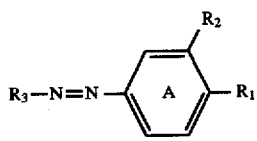

I wherein $R_1$ is an o-, p-directing substituent; $R_2$ is a substituted or unsubstituted β-hydroxyalkyl group; $R_3$ is an aromatic carbpcyclic or heterocyclic group; and wherein the benzene ring A may also contain one or more other substituents.

The o-, p-directing substituent $R_1$, may, for example, be a hydroxyl group, or a nitrogen-containing group of the formula —$NR_4R_5$, where $R_4$ and $R_5$ may each independently be, for example, a hydrogen atom or a substituted or unsubstituted alkyl group, or an aralkyl group, or $R_4$ and $R_5$ may, together with the nitrogen atom, form a cyclic structure. As examples of alkyl groups represented by $R_4$ and $R_5$ there may be mentioned methyl, ethyl, propyl and butyl groups. Examples of substituted alkyl groups are β-hydroxyethyl, β-acetoxyethyl and β-cyanoethyl groups. An example of an aralkyl group is the benzyl group and, as examples of cyclic structures formed by $R_4$, $R_5$ and the nitrogen atom there may be mentioned pyrrolidine and piperidine groups.

The β-hydroxyalkyl group represented by $R_2$ is preferably a β-hydroxyethyl group, —$CH_2.CH_2.OH$, but it may contain more than two carbon atoms and/or more than one hydroxyl group. As examples of groups containing more than two carbon atoms there may be mentioned α- and β-methyl-β-hydroxyethyl and α, β-dimethyl-β-hydroxyethyl groups and, as an example of a group containing more than one hydroxyl group there may be mentioned an α β-dihydroxyethyl group.

The nature of the aromatic carbocyclic or heterocyclic group represented by $R_3$ may vary widely. It may be mono- or polycyclic and it may be substituted or unsubstituted. Specific examples are given below in connection with the preparation of the compounds of Formula I. When the compounds of the invention are to be used either as dyestuffs, or for the preparation of dyestuffs, $R_3$ may carry up to a maximum of two acidic groups and, optionally, further substituents which are non-ionisable. Examples of such acidic groups are sulphonic, carboxylic and phosphonic acid groups, which are normally in the form of a salt.

The illustrated benzene ring, A, in Formula I above may optionally have one or more further substituents. Preferably, any such further substituents should not be electron-withdrawing. Among the preferred possible further substituents are substituted or unsubstituted alkyl and alkoxy groups, halogen atoms, and further groups $R_2$. Preferably, a further substituent is para- to the (main) $R_2$ group.

The compounds of Formula I can be made by diazotising an amine of formula $R_3$—$NH_2$, $R_3$ being defined as above, and reacting the resulting diazonium salt with a compound of formula:

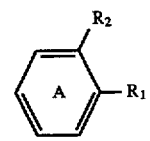

II where $R_1$, $R_2$ and A are as defined above.

As examples of compounds of Formula II there may be mentioned:

2-(α-methyl-β-hydroxyethyl)-phenol;
2-(β-methyl-β-hydroxyethyl)-phenol;
2-(α,β-dimethyl-β-hydroxyethyl)-phenol;
2-(β-methyl-β-hydroxyethyl)-5-methylaniline;
2-(β-hydroxyethyl)-6-methoxyaniline;
2-(β-methyl-β-hydroxyethyl)-aniline;
2-(α-methyl-β-hydroxyethyl)-aniline;
2-(β-hydroxy-ethyl)-N-N-dimethylaniline;
2-(β-methyl-β-hydroxyethyl)-N,N-dimethylaniline; and especially,
2-(β-hydroxyethyl)-aniline.

Examples of the amines represented by $R_3NH_2$ which may be used to prepare compounds of Formula I by the process outlined above are aniline, 2-, 3- and 4-methylaniline, 2- and 4-methoxyaniline, 2-, 3- and 4-chloroaniline, 4-bromoaniline, 2-, 3- and 4-nitroaniline, 3- and 4-aminoacetanilide, 2-aminophenylethanol, 5-nitro-2-aminophenylethanol, 2-chloro-4-nitroaniline, 4-chloro-2-nitroaniline, 4- and 5-chloro-2-methylaniline, 2-nitro-4-methoxyaniline, 2,5-dichloroaniline, 2,4-dinitroaniline, 4-aminobenzene-sulphonamide, 4-aminobenzenesulphondimethylamide, 2-, 3-, and 4-aminobenzoic acid, 3- and 4-aminophthalic acid, 4- and 4-aminoisophthalic acid, aminoterephthalic acid, 3-nitro-4-5-aminobenzoic acid, 3-amino-4-methylbenzoic acid, aminobenzoic acid, 3-amino-4-chlorobenzoic acid, 3-amino-4-methoxy benzoic acid, orthanilic acid, metanilic acid, sulphailic acid, aniline-2,5-disulphonic acid, 2-chloroaniline-5-sulphonic acid, 4-nitroaniline-2-sulphonic acid, 2-nitroaniline-4-sulphonic acid, 4-methyl-aniline-2-sulphonic acid, 2-methylaniline-4- and -5-sulphonic acid, 2,5-dichloroaniline-4-sulphonic acid, 2-methoxyaniline-4-sulphonic acid, 4- and 5-sulphoanthranilic acid, 2-aminonaphthalene-1-, -5- and -6-sulphonic acids, 2-naphthylamine-1,5-, -4,8- and -5,7-disulphonic acids, 1-naphthylamine-4- and -6-sulphonic acids and 3-aminobenzene phosphonic acid, 2-aminobenzthiazole and 2-amino-6-methoxybenzthiazole.

One preferred type of compound of the invention is that in which there is, at most, a single sulphonic acid group located on the group $R_3$.

When, in the above process, the diazotised amine is condensed with 2-aminophenylethanol, it may be advantageous to facilitate the coupling by first reacting the 2-aminophenylethanol with an equivalent amount of formaldehyde and an equivalent amount of sodium bisulphite in order to form the ω-methanesulphonate derivative, coupling the diazonium salt derived from $R_3$—$NH_2$ with this derivative and then hydrolysing the product by heating with an alkali such as a dilute solution of sodium hydroxide in order to generate the aminoazo compound of formula I.

Whilst the compounds of Formula I do, on occasion, have the character of synthetic dyestuffs and, in these circumstances, can be used as such, they are principally useful as intermediates for the preparation of other materials, especially other synthetic organic colouring materials. Thus, for example, when R1 is a hydroxyl group this can be methylated or ethylated or reacted with a sulphonyl halide such as 2-toluenesulphonyl chloride to yield useful dyestuffs and, when $R_1$ is $NH_2$, the compounds of Formula I can be diazotized and the resulting diazonium salt coupled with a coupling component to make diazo dyestuffs. The compounds of Formula I can also be used in the manufacture of other material since they are very versatile chemical compounds.

In order that the invention may be more fully understood, the following Examples are given by way of illustration only.

EXAMPLE 1

An ice-cold solution of 19.5 parts of the sodium salt of sulphanilic acid and 7 parts of sodium nitrite in 250 parts of water was run into a mixture of 25 parts of concentrated hydrochloric acid, 100 parts of ice and 100 parts of water. After stirring the resulting diazonium salt suspension for 15 minutes, slight excess of nitrous acid was destroyed by the addition of a few drops of a 10% solution of sulphamic acid. The diazonium salt suspension was then added to an ice cold solution of 13.7 parts of 2-aminophenylethanol in 100 parts of water followed by 30 parts of sodium acetate trihydrate. After stirring the coupling overnight, the sodium salt of the aminoazo compound so formed was precipitated by the addition of 120 parts of sodium chloride, filtered off, washed with 250 parts of a 20% aqueous solution of sodium chloride and dried at 50° C.

EXAMPLES 2–8

Example 1 was repeated except that the 19.5 parts of the sodium salt of sulphanilic acid were replaced by an equivalent amount of various other amines as indicated in Table 1, to produce corresponding compounds of the inventions.

TABLE 1

| Example | $R_3$—$NH_2$ |
|---|---|
| 2 | p-aminobenzoic acid |
| 3 | Orthanilic acid |
| 4 | 2-Chloroaniline-4-sulphonic acid |
| 5 | 2-Naphthylamine-1-sulphonic acid |
| 6 | Metanilic acid |
| 7 | 4-Nitroaniline-2-sulphonic acid |
| 8 | Aniline-2,5-disulphonic acid |

EXAMPLE 9

12.7 Parts of 4-chloroaniline was dissolved in 250 parts of water and 25 parts of concentrated hydrochloric acid and the solution cooled below 5° C. and diazotised by the addition of 50 parts of a 2M solution of sodium nitrite. The resulting diazonium salt solution was added to a solution of 13.7 parts of 2-aminophenylethanol in water, followed by 30 parts of sodium acetate trihydrate. After stirring for 30 minutes the precipitated aminoazo compound was filtered off, washed with 100 parts of water and dried.

EXAMPLES 10–14

Example 9 was repeated except that the 12.7 parts of the 4-chloroaniline was replaced by the equivalent amount of the amine listed in Table 2, to obtain corresponding compounds of the invention.

TABLE 2

| Example | $R_3$—$NH_2$ |
|---|---|
| 10 | 2,5-Dichloroaniline |
| 11 | 4-Nitroaniline |
| 12 | 2-Methylaniline |
| 13 | 2-Chloroaniline |
| 14 | 4-Bromoaniline |

EXAMPLES 15–20

Example 9 was repeated except that 13.7 parts of 2-aminophenylethanol was replaced by the equivalent amount of the compound listed in Table 3 to obtain corresponding compounds of the invention.

TABLE 3

| Example | |
|---|---|
| 15 | 2-(β-methyl-β-hydroxyethyl)-5-aniline |
| 16 | 2-(β-hydroxyethyl)-6-methoxyaniline |
| 17 | 2-(β-hydroxyethyl)-N,N-dimethylaniline |
| 18 | 2-(β-methyl-β-hydroxyethyl)N,N-dimethylaniline |
| 19 | 2-(β-methyl-β-hydroxyethyl)aniline |
| 20 | 2-(α-methyl-β-hydroxyethyl)aniline |

EXAMPLE 21

An ice-cold solution of 19.5 parts of the sodium salt of sulphanilic acid and 7 parts of sodium nitrite in 250 parts of water was run into a mixture of 25 parts of concentrated hydrochloric acid, 100 parts of ice and 100 parts of water. After stirring the resulting diazonium salt suspension for 15 minutes, slight excess of nitrous acid was destroyed by the addition of a few drops of a 10% solution of sulphamic acid. The diazonium salt suspension was then added to an ice cold solution of 15.2 parts of 2-(α-methyl-β-hydroxyethyl) phenol and 4 parts of sodium hydroxide in 100 parts water to which 10 parts of anhydrous sodium carbonate had been added. The coupling was stirred for one hour and the pH adjusted to 6 by the addition of concentrated hydrochloric acid. The sodium salt of the sulphonated azo compound so formed was precipitated by the addition of 100 parts of sodium chloride, filtered off, washed with 250 parts of a 20% aqueous solution of sodium chloride and dried at 50° C.

EXAMPLE 22

35.8 parts of the monosodium salt of the azo dye prepared as described in Example 21 were dissolved in 250 parts of water containing 5 parts of sodium hydroxide and the solution heated to 40° C. This solution was stirred at 40° C. whilst 18.9 parts of dimethylsulphate were added over 30 minutes. During this addition further sodium hydroxide as a 30% solution was added as required to maintain a pH greater than 9.

The sodium salt of the dyestuff so produced was precipitated by the addition of 25 parts of sodium chloride, filtered off, washed with 250 parts of a 10% aqueous solution of sodium chloride and dried at 50° C.

EXAMPLE 23

Example 22 was repeated with the exception that 18.9 parts of dimethylsulphate were replaced by 28.5 parts of p-toluenesulphonyl chloride.

EXAMPLES 24–25

Example 21 was repeated except that the 15.2 parts of 2-(α-methyl β-hydroxyethyl)phenol was replaced by an appropriate amount of the phenols listed in Table 4.

TABLE 4

| Example | Phenol |
|---------|--------|
| 24 | 2-(β-methyl-β-hydroxyethyl)phenol |
| 25 | 2-(α,β-dimethyl-β-hydroxyethyl)phenol |

EXAMPLE 26

13.7 parts of 2-aminophenylethanol were added to a solution of 10 parts of a 40% formaldehyde solution and 40 parts of a 35% sodium bisulphite solution in 100 parts of water and the solution warmed to 90° C., held at this temperature for 15 minutes and then cooled below 5° C. The precipitated ω-methanesulphonate derivative was filtered off and re-suspended in 100 parts water.

A suspension of the diazonium salt prepared as described in Example 1 from 19.5 parts of sulphanilic acid sodium salt, was added to the suspension of the ω-methanesulphonic acid derivative followed by 30 parts of sodium acetate trihydrate. After stirring overnight, 80 parts of 30% sodium hydroxide solution was added and the mixture heated to 95° C. and held at this temperature for one hour. The solution was then cooled and acidified with concentrated hydrochloric acid. After saturating the solution with sodium chloride, the precipitated dyestuff was filtered and dried at 50° C.

We claim:

1. An azophenyl compound of the formula:

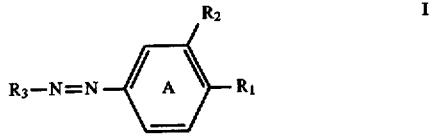

wherein $R_1$ is a nitrogen-containing group of the formula —$NR_4R_5$, where $R_4$ and $R_5$ are independently each selected from the group consisting of a hydrogen atom and substituted and unsubstituted alkyl groups and aralkyl groups; $R_2$ is β-hydroxyethyl; $R_3$ is unsubstituted phenyl or phenyl substituted at the 4-position with carboxyl or sulfonyl, and wherein the benzene ring A may contain at least one further substituent.

2. A compound according to claim 1, wherein $R_4$ and $R_5$ are independently each selected from methyl, ethyl, propyl, butyl, β-hydroxyethyl, β-acetoxyethyl, β-cyanoethyl and benzyl.

3. A compound according to claim 1, wherein the ring A has at the position para- to the $R_2$ substituent, an additional substituent selected from hydrogen, substituted and unsubstituted alkyl and alkoxy groups, and halogen atoms.

* * * * *